United States Patent [19]

Cooke

[11] Patent Number: 5,247,552
[45] Date of Patent: Sep. 21, 1993

[54] SHORTENED AND BOAT-TAILED END FOR BWR FUEL ASSEMBLY WATER CHANNEL

[75] Inventor: George C. Cooke, Richland, Wash.
[73] Assignee: Siemens Power Corporation, Richland, Wash.
[21] Appl. No.: 858,203
[22] Filed: Mar. 26, 1992
[51] Int. Cl.⁵ .............................................. G21C 3/322
[52] U.S. Cl. .................................................. 376/444
[58] Field of Search ........................................ 376/444

[56] References Cited

U.S. PATENT DOCUMENTS

| | | | |
|---|---|---|---|
| 3,574,058 | 4/1971 | Gumuchian | 376/435 |
| 3,629,065 | 12/1971 | Knox | 376/428 |
| 3,802,995 | 4/1974 | Fritz et al. | 376/435 |
| 4,478,786 | 10/1984 | Andersson et al. | 376/444 |
| 4,675,154 | 6/1987 | Nelson et al. | 376/444 |
| 4,708,846 | 11/1987 | Patterson et al. | 376/444 |
| 4,781,885 | 11/1988 | Lill et al. | 376/444 |
| 4,826,653 | 5/1989 | Nylund et al. | 376/444 |
| 4,876,063 | 10/1989 | Johansson | 376/444 |
| 4,913,876 | 4/1990 | Lettau et al. | 376/444 |
| 4,957,698 | 9/1990 | Ritter | 376/444 |

FOREIGN PATENT DOCUMENTS 1-276095 11/1989 Japan.

Primary Examiner—Daniel D. Wasil
Attorney, Agent, or Firm—Ira Lee Zebrak

[57] ABSTRACT

A nuclear fuel assembly for a light water reactor includes an axially directed shortened water channel, truncated between an uppermost spacer and an upper tie plate. A boat-tail shaped end fitting is mated to the truncated end of the water channel, with their mated outer surfaces forming a smooth tangential substantially continuous surface therebetween. Opposing outer side surfaces of the end fitting are substantially convex, and inwardly tapering toward one another in a continuously curved manner, with the side surfaces terminating to form a top aperture. The aperture provides for the exit of coolant moderator from the water channel, and is sized to equalize the internal flow velocity of coolant moderator exiting from said aperture to the external coolant moderator flow velocity at said aperture.

15 Claims, 6 Drawing Sheets

SHORTENED AND BOAT-TAILED END FOR BWR FUEL ASSEMBLY WATER CHANNEL

INTRODUCTION

1. Field of the Invention

The present invention relates to nuclear fuel assemblies for light water reactors, and more particularly, to the central or internal water channel(s).

2. Background

In nuclear reactors intended for the generation of power, nuclear fuel assemblies are customarily of the rod type which are arranged in closely spaced parallel arrays in generally square configurations. As is well known, each fuel assembly for a boiling water type of water cooled reactor is typically enclosed by an outer channel, usually square, which confines the coolant which enters that fuel assembly to that particular fuel assembly until it exits the assembly at the top of the reactor core. The coolant passing through the fuel assembly consists of a mixture of liquid water and steam. At the bottom entrance of the fuel assembly, the coolant is liquid water having a temperature at/or slightly below its saturation temperature. As coolant flows upward through the assembly, power is transferred from the fuel rods to the coolant, steam is produced, and the fraction of steam in the coolant is increased. At the top of the fuel assembly, the coolant which has been heated by the fuel rods is primarily steam. As a result of a high volume fraction of steam in the upper region of the reactor core, the upper region of the core becomes undermoderated and overenriched due to the presence of too few hydrogen atoms compared to the number of fissionable uranium or plutonium atoms. As a consequence, less than optimum uranium utilization results.

Figure 1:
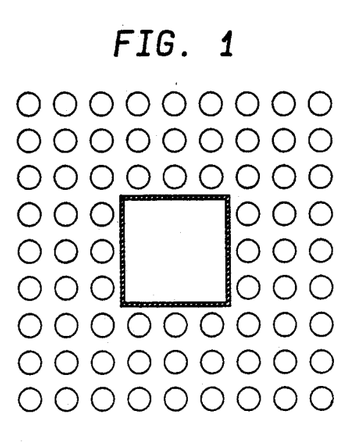
FIG. 1 illustrates a cross-sectional view of a fuel assembly with fuel rods and a central water channel having a square cross-sectional area.
Figure 2:
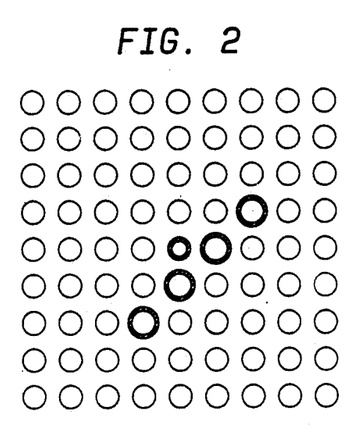
FIG. 2 illustrates a cross-sectional view of a fuel assembly with fuel rods and an array of circular tubes as the central water channel.
Figure 3:
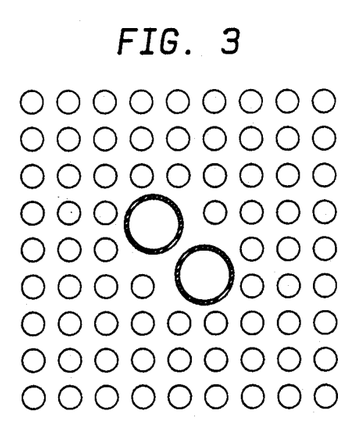
FIG. 3 illustrates a cross-sectional view of a fuel assembly with fuel rods and an array of two circular tubes as the central water channel.
Figure 4:
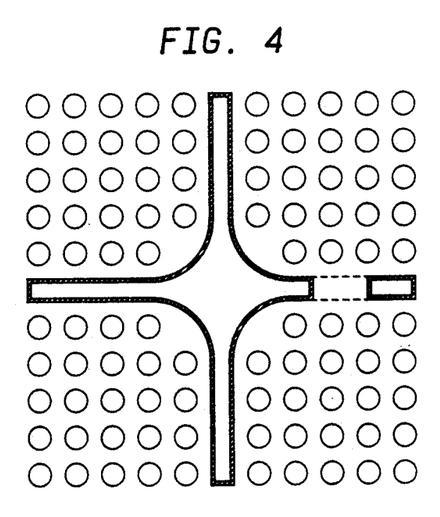
FIG. 4 illustrates a cross-sectional view of a fuel assembly with fuel rods and a central water channel having a cruciform cross-sectional area.

In addition to the upper region being undermoderated and overenriched, a further problem in typical boiling water reactors is that the central region of the fuel assemblies may be undermoderated and overenriched. In order to increase the amount of moderator, usually water, so as to improve neutron moderation and economy, an elongated central water channel is provided which forms a centrally disposed path for the flow of moderator/coolant along the length of, but physically separated from, the fuel rods. The central water channel can have any cross-sectional area and/or geometry, positioned centrally and symmetrically within the outer channel, or asymmetrically displaced from the central axis within the outer channel, and can be oriented around its central axis so that its walls which extend the length of the assembly are either parallel or non-parallel to the walls of the outer channel. The central water channel can have a square cross-sectional area (FIG. 1) or an array of circular tubes extending along the length of the fuel assembly. FIG. 2 shows a fuel assembly with four large water rods and one small water rod. FIG. 3 shows a fuel assembly with two very large water rods. In another design, the cross-sectional area of the central water channel is a cruciform and is used to divide the rod array into quadrants (FIG. 4). An example of the square central water channel is also shown in U.S. Pat. No. 4,913,876. Sufficient liquid coolant is circulated through the central channel or tubes to keep the contained coolant largely or completely in the liquid phase. The liquid moderator inside the water channel(s) not only increases moderation in the center of the assembly, but also increases moderation in the upper regions of the assembly. The presence of liquid as contrasted to gaseous moderator in the central region of the fuel assembly increases the nuclear performance of the assembly by providing a greater number of hydrogen atoms which function, inpart, to slow down neutrons and thereby increase the likelihood of further fissions.

Another important attribute of a central water channel is that the void coefficient of reactivity is less negative. By having the void coefficient of reactivity less negative, reactor stability improves by reducing the coupling between core reactivity and core moderator thermal hydraulic conditions. The moderator in the fuel assembly that is not within the central water channel(s) and which is termed active coolant surrounds the nuclear fuel rods and is heated by means of conduction/convection. As reactivity increases, heating of the active coolant is increased. Increased heating of the active coolant results in greater steam void formation and a reduction in moderation. The increase in voids and reduced moderation results in reduced reactivity. Heating of the coolant/moderator which is within the central water channel(s) is relatively small and is largely unaffected by the heat released from the fuel rods. Thus, an assembly with a central water channel(s) has a greater fraction of moderator in the core that does not become voided when reactivity increases. There is thus less decrease in reactivity due to steam void formation.

Regardless of the particular configuration, each central water channel within a fuel assembly has an inlet at the bottom to allow subcooled liquid water to enter the central water channel and an outlet at the top. The inlet subcooling and the flow rate inside the central water channel are such that the coolant which flows up inside the central water channel does not experience any significant boiling. The objective of incorporating such internal channels is to increase the amount of liquid water within the fuel assembly and thus achieve increased neutron moderation in the center and top parts of the fuel assembly. The primary benefits of this increased moderation are improved fuel utilization and improved stability (e.g., less tendency towards coupled nuclear/thermal-hydraulic oscillations).

The central water channel extends between the lower and upper tie plates and is mechanically connected directly, or indirectly, to these tie plates. Except for the inlets, outlets, and the means of connection to tie plates, the shape of the central water channel as exemplified in FIGS. 1-4 is generally constant over its entire length from the lower to the upper tie plates. In addition to its neutronic function, the central water channel frequently has a secondary mechanical function as a spacer capture mechanism that serves to limit axial movement of the spacers.

As is well known, improvements in fuel cycle costs may be achieved by increasing the net amount of fuel in the fuel assembly. Although increasing the diameter of the fuel rods would produce such an increase, it would also result in the concomitant increase in the resistance to coolant flow within the assembly and an increase in pressure drop. Spacer grids also contribute significantly to the resistance to coolant flow and pressure drop.

It is also well known that heat transfer and therefore power capability is enhanced if a continuous film of water is maintained on the surface of the nuclear fuel rods. Since reactor power levels are limited by the amount of coolant flowing through the assembly as well as by local heat transfer conditions present at the surface of the fuel rods, it is highly desirable to limit the pressure drop which occurs from the bottom to the top of the fuel assembly.

A decrease in the pressure drop across the length of the fuel assembly results in improved reactor stability, permits the use of larger fuel rods and therefore increases the amount of fuel, and allows the use of spacer designs which have higher pressure drop.

It would thus be an advantage over the prior art to reduce the pressure drop which occurs over the length of the bundle between lower and upper tie plates.

SUMMARY OF THE INVENTION

A nuclear fuel assembly for a light water reactor is disclosed having a lower tie plate for securing in spaced relationship bottom ends of nuclear fuel rods, an upper tie plate for securing in spaced relationship the top ends of the fuel rods, at least an uppermost spacer located between the upper and lower tie plates, the fuel rods passing through apertures in the uppermost spacer, and being retained in spaced apart relationship by the uppermost spacers, means for permitting coolant moderator to flow from the lower tie plate, upward about the fuel rods, and through the upper tie plate, an axially directed shortened water channel having a lowermost inlet secured to the lower tie plate, for receiving coolant moderator, an upper portion of the water channel being passed through an opening in the uppermost spacer, the water channel having a truncated upper end below the upper tie plate at an axial height within the fuel assembly in substantially a plane intercepting top enriched fuel portions of the fuel rods in the bottom of a natural blanket region, and a boat-tail shaped end fitting having a lower end mated to the truncated top end of the shortened water channel, and an upper end providing an aperture permitting the exit of coolant moderator flowing through the water channel, the boat-tail shaped end fitting substantially eliminating turbulent flow of coolant moderator thereabove.

DESCRIPTION OF THE PREFERRED EMBODIMENT

The top one to two feet of the central water channel within fuel assemblies for boiling water reactors has little importance to neutron moderation. This is particularly the case for the upper approximately one foot of the central water channel since this portion of the channel lies above the top of the active fuel column in the fuel rods. The approximately one foot vertical extent of fuel rods provides an internal gas plenum region for the capture of fission product gases. Also, since natural uranium can be used in the upper one half foot to one foot of the active fuel column just below the gas plenum, liner heat rate levels are reduced in this region. The neutronic significance of the central water channel in the upper natural blanket region of the fuel assembly is correspondingly reduced.

In order to decrease the pressure drop across the length of the fuel assembly, the central water channel is shortened by truncating the top one to two feet. The top end of the shortened central water channel, unlike conventional water channels, does not extend to, nor is secured to the upper tie plate. Rather than extending all the way to the upper tie plate, the shortened central water channel terminates at an axial height within the fuel assembly at the top of the enriched fuel portion of the fuel rods in the bottom of the natural blanket region. The uppermost spacer of typical BWR fuel assemblies is positioned at the top of the enriched fuel portion of the fuel rods. In a preferred embodiment of the present invention, the shortened central water channel terminates at or above the uppermost spacer which serves to limit axial movement of the spacer.

Figure 7:
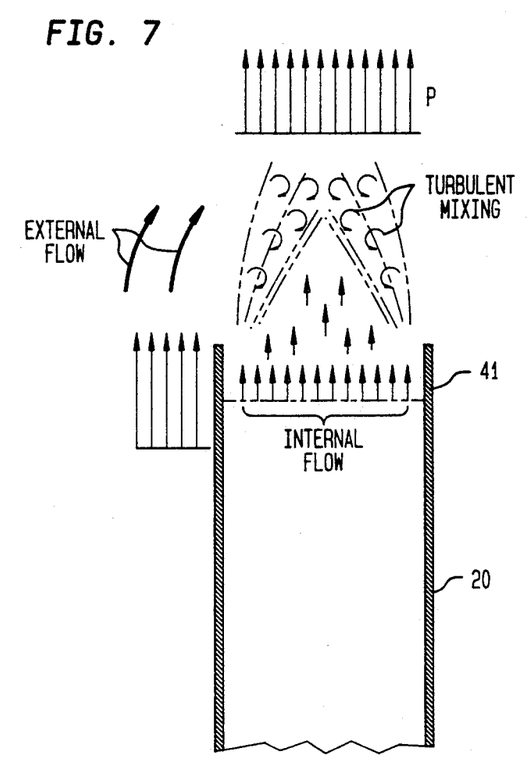
FIG. 7 illustrates the top portion of a shortened central water channel without any end cap.

As a result of shortening the central water channel, the wetted surface area of the central water channel which would have extended up to the upper tie plate had the central water channel not be shorted, is eliminated. In addition, at the top end of the shortened central water channel, the active coolant flow area (i.e., the cross sectional flow area through the fuel assembly excluding the cross-sectional flow area within the central water channel) increases to the full cross sectional flow area of the fuel assembly due to the elimination of the flow area occupied by the central water channel. By eliminating the wetted surface area of the central water channel in the upper one to two feet of the fuel assembly, and by increasing the active flow area which reduces coolant velocities, the pressure drop across the fuel assembly having a shortened central water channel as shown in FIG. 7 is reduced by 3% or 0.6 psia which permits an approximately 2% increase in the amount of uranium that can placed within the fuel assembly.

While shortening the central water channel by truncating the top one or two feet improves pressure drop performance, undesirable effects could occur. First, large turbulent eddies in the volume within the fuel bundle above the end of the central water channel might produce vibration and thus fretting damage of the surrounding full length fuel rods and the internal channel itself. Second, excessive cross flows at the truncation elevation, possibly enhanced by both large turbulent eddies and the subcooling of the central water channel flow might strip the desirable liquid water film from the surface of the surrounding rods. Third, a liquid spillage effect might occur for low reactor flow rates where the liquid coolant moderator emanating from the top of the truncated central water channel spills downward along the outside surface of the central water channel walls such that the distribution of coolant flow up through the upper spacer becomes maldistributed, and critical heat flux performance of the fuel upstream of the spacer is degraded.

Figure 5:
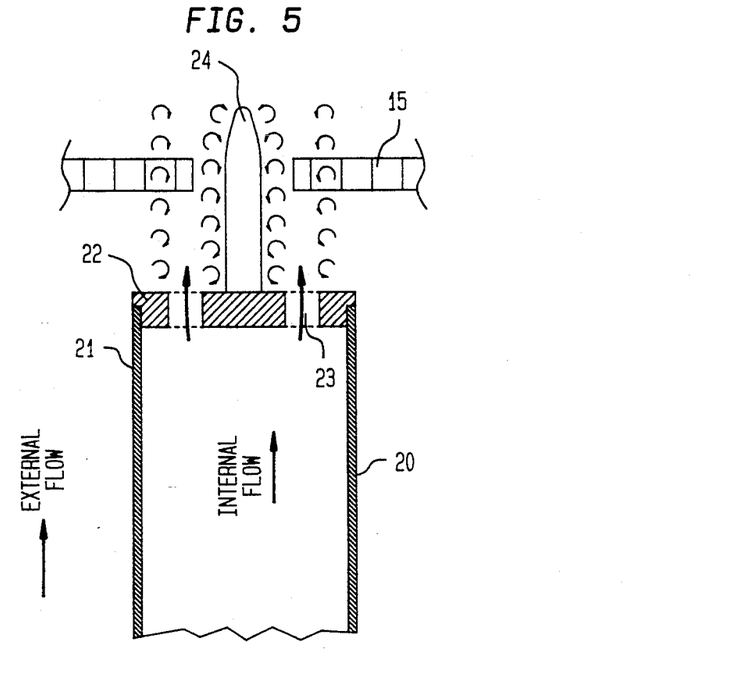
FIG. 5 illustrates the top portion of a full length central water channel within a fuel assembly.

The turbulence that occurs in the upper portion of fuel assemblies having a full length central water channel and a shortened central water channel is shown in FIGS. 5-8. The top portion of a fuel assembly with a full length central water channel 21 is shown in FIG. 5. An apertured end cap 22 is secured to the upper end of the central water channel. Apertures 23 in the end cap 22 are exit holes for the coolant flow within the central water channel. Although apertured end cap 22 is shown in FIG. 5 for a single square or rectangular central water channel, the following discussion is equally applicable to a fuel assembly having an apertured end cap configured to match the cross sectional area of any central water channel including those shown in FIGS. 1-2 and 4. A central water channel support pin 24 is provided which positions and aligns the central water channel with respect to upper tie plate 15.

Figure 6:
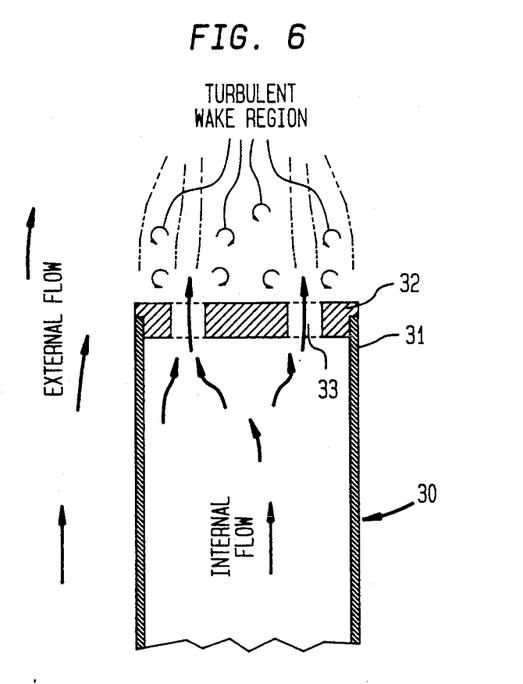
FIG. 6 illustrates the top portion of a shortened central water channel and an apertured end cap within a fuel assembly.

FIG. 6 shows the top portion 31 of a shortened central water 30 channel within a fuel assembly. An apertured end cap 32 similar to that shown in FIG. 5 is secured to the shortened end of the central water channel. The flow velocities towards the top of the fuel assembly within the central water channels shown in FIG. 5 and FIG. 6 are a small fraction (less than one fourth) of the flow velocities outside of the central water channel. As in FIG. 5, apertures 33 in the end cap 32 shown in FIG. 6 are exit holes for the coolant flow within the central water channel. The effective flow area inside the central water channel at its top end is the area of the apertures in the end cap. The reduced flow area at apertures 23 to the end cap 22 in FIG. 5 and apertures 33 to end cap 32 in FIG. 6 accelerates the exiting central water channel flow to velocities that are approximately the same as the steam and water in the active channel flow region outside of the channel. Large turbulent wake regions occur immediately downstream of the end piece (FIG. 6.) which produce losses in stagnation pressure resulting in an increase in the pressure drop across the fuel assembly.

FIG. 7 shows a shortened central water channel 40 as in FIG. 6 but without any end cap. As contrasted to the central water channels 20, 30 shown in FIGS. 5 and 6, the flow within central water channel 40 exhausts from the central water channel with a velocity that is only a small fraction (less than one fourth) of the active channel coolant flow velocity. Downstream from top 41 of shortened central water channel 40, turbulent mixing occurs between the two merging streams that initially have significantly different velocities. Mixing continues until the coolant exiting the central water channel 40 and the active channel coolant have similar velocities as indicated by the flow profile shown as arrows and identified as P. The turbulent mixing process is very much like the formation of turbulent wakes regarding the shortened central water channel 30 and apertured end cap 32 shown in FIG. 6. In both cases, the turbulence results in the loss from the flow of mechanical energy to heat energy which manifests itself as increased pressure drop.

Figure 8:
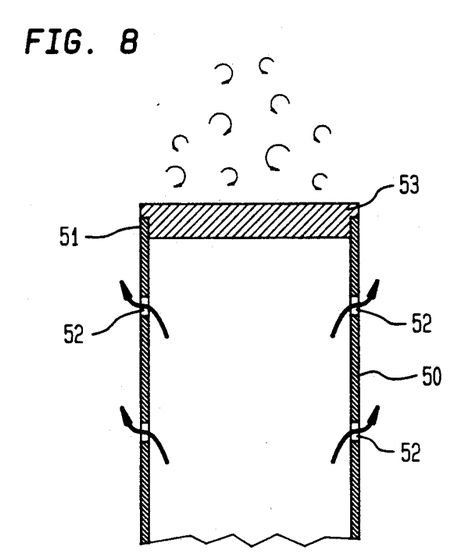
FIG. 8 illustrates the top portion of a shortened central water channel having apertured side walls and an end cap.

FIG. 8 shows a shortened central water channel 50 as in FIG. 6 but has an end cap 53 without any apertures. Instead, the central channel walls have apertures 52 which permit the channel flow to exit the central water channel laterally instead of axially into the active channel flow. Because of the lateral exhaust of the internal channel, turbulent mixing processes occur as with the shortened central water channel without any end cap shown in FIG. 7. Further, when the mixed or partially mixed flow reaches the top 51 of shortened central water channel 50, a turbulent wake forms as is shown in FIG. 6 for the shortened water channel having an apertured end cap.

Each of the shortened central water channel and end cap configurations shown in FIGS. 6, 7 and 8 as well as the full length central water channel and end cap configuration shown in FIG. 5 gives rise to turbulence which necessarily leads to increases in pressure drop. However, the fuel assembly pressure drop increase from the turbulence at the shortened end of the central water channel is approximately 20% of the reduction in pressure drop that is achieved from decreasing the wetted surface area and decreasing the velocities above the shortened central water channel.

In addition to obtaining the reduced pressure drop benefits which result from the shortened central water channel, it is also desirable to eliminate the occurrence of large turbulent eddies that might produce vibrations of surrounding fuel rods, and the occurrence of excessive cross flows that might strip liquid film from the fuel rods, as well as the occurrence of the liquid spillage effect. It would particularly desirable to retain the pressure drop benefits from the present invention of shortening the central water channel as well as eliminate the undesirable turbulence, cross flow, and liquid spillage effect, and obtain yet further pressure drop reductions.

Figure 9:
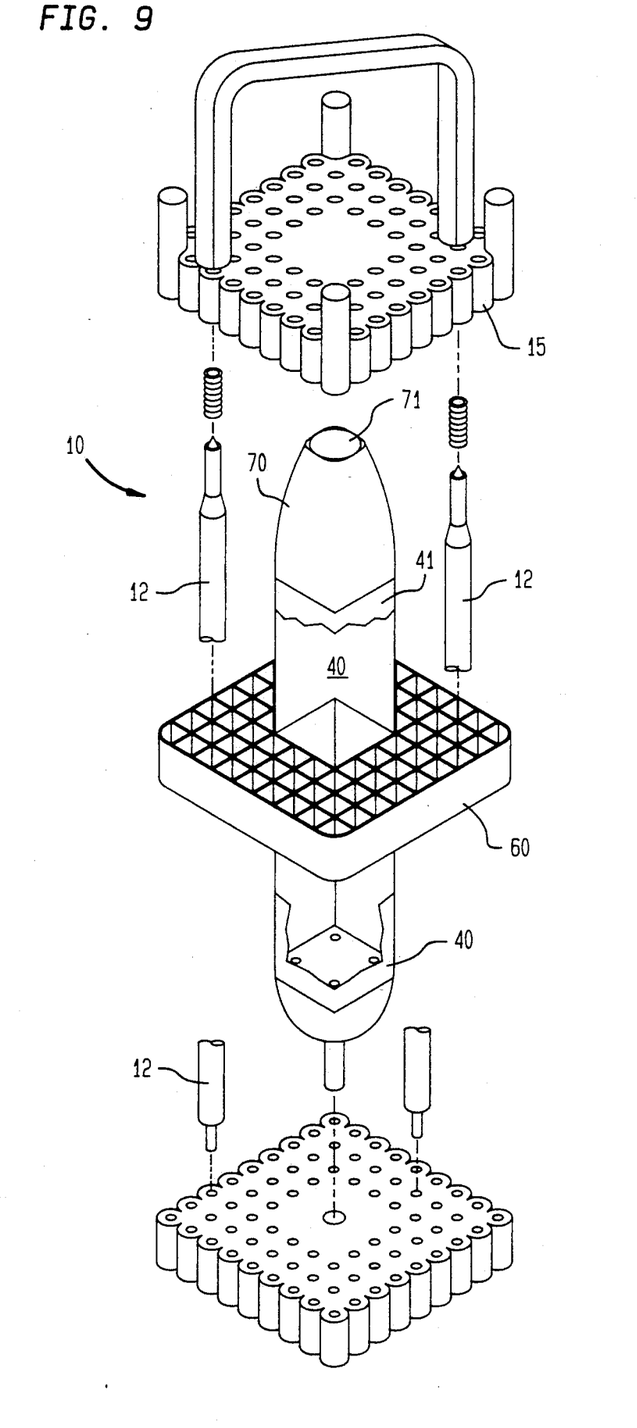
FIG. 9 is an exploded perspective view of the upper portion of a fuel assembly with the outer channel removed and showing the shortened central water channel and boat-tailed end fitting.
Figure 10:
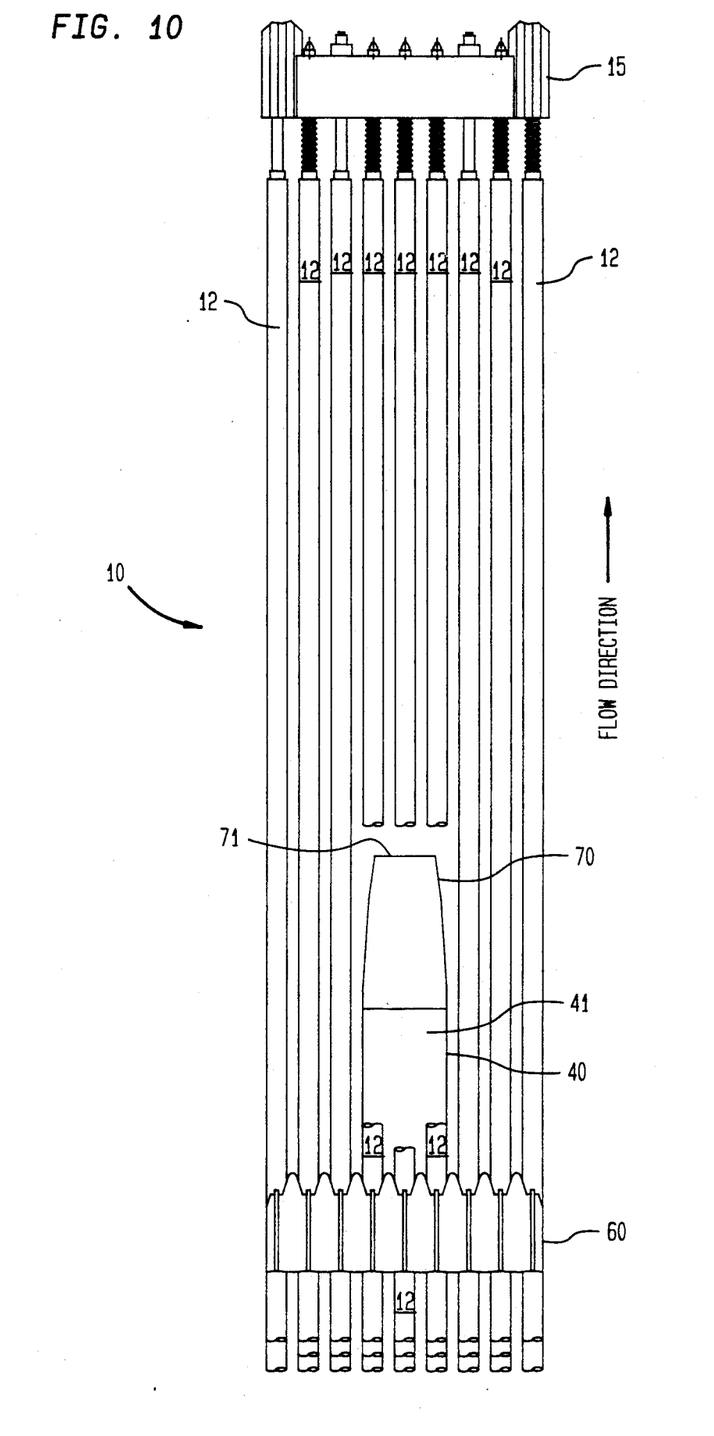
FIG. 10 is a longitudinal sectional view, partially broken away of the upper portion of the fuel assembly shown in FIG. 9.
Figure 11:
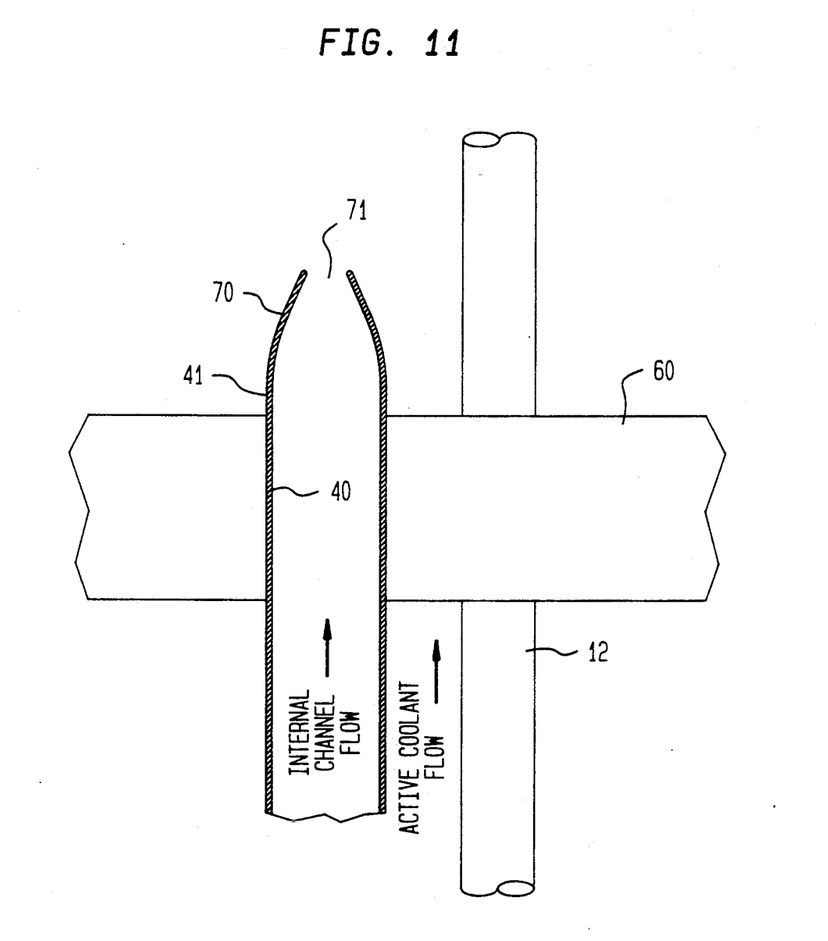
FIG. 11 is a longitudinal cross-sectional view of the shortened central water channel and boat-tailed end fitting shown in FIG. 10.

The present invention of shortening the upper portion of the central water channel obtains these further objectives by attaching a boat-tailed end fitting to the top end of the shortened central water channel as shown in FIGS. 9-11. FIG. 9 is an exploded perspective view of the upper portion of a fuel assembly 10 with most of the fuel rods 12 removed and shows a shortened central water channel 40 and a boat-tailed end fitting 70 secured to the shortened end 41. FIG. 10 is a longitudinal sectional view, partially broken away, of the upper portion of the fuel assembly shown in FIG. 9, from the upper spacer 60 to upper tie plate 15. FIG. 11 is a longitudinal cross-sectional view of the boat-tailed upper end fitting and the shortened central water channel shown in FIG. 10. Boat-tailed end fitting 70 has an aperture 71 which serves to exhaust the coolant flow from within the central water channel. In each of FIGS. 9-11, as well as FIGS. 1-8, the outer channel is not shown for clarity of illustration.

The outside surface contour of boat-tailed end piece 70 is configured so that flow separation does not occur. The connection point between the top end 41 of shortened water channel 40 and the outside surface of boat-tailed end piece 70 joins in a smooth tangent. Thus, at the connection point, there is no change in surface height or surface slope and does not have any breaks or edges. The outside surface of the boat-tailed end piece is curved inward continuously without any inflection points. The downstream edge of boat-tailed end piece forms an outlet aperture 71 for the exit of internal flow from the central water channel. The size of aperture 71 is selected such that the velocity of the internal flow exiting aperture 71 is the same as the external flow at the aperture. The streamlining afforded by the boat-tailed end piece allows the active channel flows on the sides of the water channel to approach each other and join together in a smooth non-turbulent fashion. Necking down of the central water channel is accomplished by the boat-tailed end piece and the flow inside the central water channel is accelerated to velocities that match the external active channel flow. The matching of velocities of the internal and external streams results in the elimination of turbulent mixing at the top end of the boat-tailed end piece. In order to achieve the smooth non-turbulent joining of the external streams on the sides of the central water channel with the central water channel flow, it is important that the external flow be presented with the smooth continuous surface of the boat-tailed end piece. In addition, the pressure of the external active flow field in which the boat-tailed end piece resides is decreasing in the direction that the flow is moving. This decreasing pressure arises from the wall friction of the water channel and more importantly from the wall friction of the surrounding rods which together have much greater wetted surface than the water channel. The pressure is also decreasing because of the steam generation that is generally occurring in the active channel flow region. Decreasing pressure in the direction of flow is recognized as favoring a flow remaining attached to its confining surfaces and not separating to form turbulent wakes and eddies.

While the foregoing description and drawings represent the preferred embodiments of the present invention, it will be understood by those skilled in the art that various changes and modifications may be made therein without departing from the true spirit and scope of the present invention.

What is claimed is:

1. In a nuclear fuel assembly for a light water reactor, the combination comprising:
   a lower tie plate for securing in spaced relationship bottom ends of a plurality of nuclear fuel rods;
   an upper tie plate for securing in spaced relationship the top ends of said plurality of fuel rods;
   at least an uppermost spacer located between said upper and lower tie plates, said plurality of fuel rods passing through apertures in said uppermost spacer, and being retained in spaced apart relationship by said uppermost spacer;
   means for permitting coolant moderator to flow from said lower tie plate, upward about said fuel rods, and through said upper tie plate;
   an axially directed shortened water channel having a lowermost inlet secured to said lower tie plate, for receiving coolant moderator, an upper portion of said water channel being passed through an opening in said uppermost spacer, said water channel having a truncated upper end below said upper tie plate at an axial height within said fuel assembly in substantially a plane intercepting top enriched fuel portions of said plurality of fuel rods in the bottom of a natural blanket region; and
   a boat-tail shaped end fitting having a lower end mated to the truncated top end of said shortened water channel, and an upper end providing an aperture permitting the exit of coolant moderator flowing through said water channel, said boat-tail shaped end fitting substantially eliminating turbulent flow of coolant moderator thereabove.

2. The nuclear fuel assembly of claim 1, wherein said aperture of said boat-tail shaped end fitting is sized to equalize the internal flow velocity of coolant moderator through said water channel to the external water flow velocity at said aperture, for substantially eliminating turbulent flow of coolant moderator thereabove.

3. The nuclear fuel assembly of claim 1, wherein said boat-tail shaped end fitting is joined to the truncated end of said water channel for forming a smooth tangential continuous surface therebetween across the intersecting circumferential edges thereof.

4. The nuclear fuel assembly of claim 3, wherein said boat-tail shaped end fitting further includes opposing outer side portions that are substantially convex and inwardly tapering toward one another in a continuously curved manner terminating at said aperture, thereby permitting active upward coolant moderator flow on the sides of said water channel to approach one another and join together in a smooth non-turbulent manner above said boat-tail end fitting.

5. The nuclear fuel assembly of claim 4, wherein said end fitting has a substantially square cross-section 6. In a nuclear fuel assembly including an axially directed water channel having a lower coolant moderator inlet end secured to a lower tie plate of said assembly, having an upper portion passing through and secured by an uppermost spacer of said assembly, and having an upper end truncated below an upper tie plate of said assembly in a bottom portion of a natural blanket region of said fuel assembly, a method for substantially eliminating turbulent flow of coolant moderator above said water channel comprising the steps of:
   shaping the upper portion of the truncated upper end of said water channel to include upwardly converging convex shaped side portions having a continuous curvature with no sharp inflection points; and
   forming a centrally located aperture at the plane of termination of said side portions for providing an exit portion for coolant moderator flowing upward through said water channel.

7. The method of claim 6, further including the step of sizing said aperture to substantially equalize the flow velocity of coolant moderator through said water channel to the flow velocity of water external to said aperture.

8. The method of claim 7, further including the step of forming said shaped upper portion of said water channel from a separate end fitting having a lower end portion mated to the top portion of the truncated end of said water channel.

9. The method of claim 8, further including the step of providing a smooth tangential interface between the mated lower end portion of said end fitting, and said top portion of the truncated end of said water channel.

10. The method of claim 9, further including the step of forming said end fitting to have substantially square cross section.

11. The method of claim 10, further including the step of providing a square configuration for said water channel.

12. In a BWR nuclear fuel assembly, the efficiency of coolant and moderator water flow in the upper portion of said assembly is improved via the combination comprising:
   an upper tie plate;

an uppermost spacer below said tie plate;

an axially oriented shortened water channel truncated between said upper tie plate and uppermost spacer;

a boat-tail shaped end fitting joined to the truncated end of said water channel, with the joined outer surfaces forming a smooth substantially continuous surface therebetween, with opposing outer side surfaces of said end fitting tapering inward toward one another in a continuously curved manner to terminate at uppermost ends for forming a top aperture, said aperture being sized for substantially equalizing the velocity of coolant moderator exiting from said aperture to the external velocity of coolant moderator flow outside said water channel proximate said aperture.

13. The nuclear fuel assembly of claim 12, wherein said outer surface of said boat-tail shaped end fitting are convex.

14. The nuclear fuel assembly of claim 12, wherein said end fitting has a substantially square cross-section between upper and lower ends.

15. The nuclear fuel assembly of claim 13, wherein said end fitting has a substantially square cross-section of progressively decreasing area from a lower end to said aperture.

* * * * *